(12) United States Patent
Clarke et al.

(10) Patent No.: US 7,393,466 B2
(45) Date of Patent: Jul. 1, 2008

(54) COMPOSITIONS AND METHODS FOR ANION ABSORBENT METAL HYDROXIDES

(75) Inventors: Robert Lewis Clarke, Orinda, CA (US); Dean Butler, Adelaide (AU)

(73) Assignee: Applied Intellecutal Capital, Inc., Alameda, CA (US)

( * ) Notice: Subject to any disclaimer, the term of this patent is extended or adjusted under 35 U.S.C. 154(b) by 520 days.

(21) Appl. No.: 10/480,163

(22) PCT Filed: Jun. 25, 2002

(86) PCT No.: PCT/US02/20272

§ 371 (c)(1),
(2), (4) Date: Feb. 26, 2004

(87) PCT Pub. No.: WO03/000020

PCT Pub. Date: Jan. 3, 2003

(65) Prior Publication Data

US 2004/0141904 A1    Jul. 22, 2004

Related U.S. Application Data

(60) Provisional application No. 60/300,937, filed on Jun. 25, 2001.

(51) Int. Cl.
*C01D 23/00* (2006.01)
(52) U.S. Cl. ............. 252/182.33; 252/182.35; 252/179; 252/184; 423/DIG. 14; 423/364; 423/365; 423/608; 423/609; 502/11; 502/400; 210/683; 210/684; 210/904
(58) Field of Classification Search ......... 423/DIG. 14, 423/364, 365, 608, 609; 502/11, 400; 210/683, 210/684, 904; 252/184, 182.33, 182.35, 252/179
See application file for complete search history.

(56) References Cited

U.S. PATENT DOCUMENTS

| 2,619,474 | A | * | 11/1952 | Gutzeit | 502/175 |
| 3,332,737 | A | * | 7/1967 | Kraus | 423/6 |
| 3,382,034 | A | * | 5/1968 | Kraus | 423/24 |
| 4,362,626 | A | | 12/1982 | Takeuchi et al. | |
| 4,576,969 | A | | 3/1986 | Echigo et al. | |
| 4,855,059 | A | | 8/1989 | Frianeza-Kullberg | |
| 5,055,199 | A | * | 10/1991 | O'Neill et al. | 210/684 |
| 5,071,563 | A | | 12/1991 | Shiga et al. | |
| 5,536,415 | A | | 7/1996 | Joubert | |
| 5,578,218 | A | | 11/1996 | Matsuoka et al. | |
| 5,948,265 | A | | 9/1999 | Wakamatsu et al. | |
| 6,238,544 | B1 | | 5/2001 | Oohara et al. | |

OTHER PUBLICATIONS

Ion Exchange Properties of Hydrous Oxides, Kraus, et al., Proceedings of the Second United Nations International Conference on the Peaceful Uses of Atomic Energy, vol. 28, pp. 3-16, Geneva, Sep. 1958.*

* cited by examiner

*Primary Examiner*—Steven Bos
(74) *Attorney, Agent, or Firm*—Fish & Associates, PC

(57) ABSTRACT

A metal hydroxide complex has a formula Me(OH)4*A_*nH2O or MeO2*A_*nH2O. Preferred complexes are formed in an alkaline medium, and particularly especially preferred anions include cyanide and cyanide gold complexes. Contemplated complexes are formed on a metal hydroxide (e.g., hydrated zirconium, hafnium, and titanium hydroxide), which may be disposed in a porous container. Consequently, contemplated compounds may be used in methods of reducing the concentration of an anion in an alkaline medium.

9 Claims, No Drawings

COMPOSITIONS AND METHODS FOR ANION ABSORBENT METAL HYDROXIDES This application claims the benefit of U.S. provisional application having Ser. No. 60/300,937, filed Jun. 25, 2001, which is incorporated herein by reference.

FIELD OF THE INVENTION

The field of the invention is selective removal of anionic species from a fluid, and particularly relates to recovery of cyanide and metal cyanides.

BACKGROUND ON THE INVENTION

Zirconium hydroxides and related compounds (e.g., titanium hydroxide, hafnium hydroxide) have been employed for isolation and/separation of selected ionic species under certain binding conditions, and depending on the particular ionic species, such compounds may have superior separation characteristics when compared to ionic exchange resins.

For example, U.S. Pat. No. 4,362,626 to Takeuchi et al. describes a preparation in which zirconium hydroxide is mixed with an epoxy resin, an unsaturated polyurethane, or polyethylene, and cured to form an adsorbent material. Takeuchi et al. use such materials to isolate phosphate anions from an aqueous solution at relatively highly acid pH (pH 3.0). Similarly, Echigo et al. describe in U.S. Pat. No. 4,576,969 an ion exchange resin in which a crosslinked phenolic resin encloses a water insoluble metal hydroxide, and wherein the inventors isolate cationic arsenic ($As^{3+}$) from an aqueous medium at relatively acidic pH (pH 6.0).

In another example, as described in U.S. Pat. No. 5,578,218 to Matsuoka et al. the inventors utilize a polymeric resin that carries zirconium hydroxide to remove sulfate anions from a brine at relatively highly acidic pH (typically between pH 1.0-5.0, and preferably between 2.0 and 3.0). Alternatively, sulfate anions may be removed using zirconium hydroxide-coated activated carbon as described in U.S. Pat. No. 5,948,265 to Wakamatsu et al., and Shiga et al describe in U.S. Pat. No. 5,071,563 the use of a zirconium hydroxide slurry to bind sulfate wherein both, Wakamatsu and Shiga, employ relatively strong acidic conditions (e.g., pH 3.0-5.0) to bind the sulfate anion to their materials. Similar conditions and compositions are described to Joubert in U.S. Pat. No. 5,536,415.

In a still further example, as described in U.S. Pat. No. 6,238,544 to Oohara et al., iodine anions (e.g., iodate and periodate) are removed from an aqueous solution to be used for electrolysis by contacting the solution with a metal hydroxide under strongly acidic conditions (pH 3.0), wherein the metal hydroxide is (at least in some cases) disposed on a cation exchange resin. While most of the resin-metal hydroxide combinations may be particularly advantageous for column separation (e.g., desirable flow rates), the ion binding capacity of the metal hydroxide is often significantly reduced by the resin portion.

In order to circumvent at least some of the problems associated with reduced ion binding capacity of resin-bound metal hydroxides, Clarke et al. describe the use of metal hydroxides pastes and slurries for the removal and/or isolation of selected anionic species (arsenate, chromate, selenate, borate, fluoride, and perchlorate) under substantially neutral conditions (pH 6.0-7.5) using a layer of the metal hydroxide in a configurations with a high aspect ratio. In yet another example, as described in U.S. Pat. No. 4,855,059 to Frianeza-Kullberg, metallic cations ($Ca^{2+}$ and $Mg^{2+}$) are isolated from an alkaline aqueous solution using a metal hydroxide.

However, while most of the known metal hydroxide compositions and methods exhibit at least some advantage over other known materials to isolate cationic or anionic species from a medium, the pH of such media is generally limited to acidic (or at best neutral) pH.

Therefore, although there are numerous uses for metal hydroxides known in the art, all or almost all of them suffer from one or more disadvantages. Consequently, there is still a need to provide improved compositions and methods for metal hydroxides, and especially for adsorption of anions under alkaline conditions.

SUMMARY OF THE INVENTION

The present invention is directed to a metal hydroxide complex having the formula $Me(OH)_4*A^-*nH_2O$ or $MeO_2*A^-*nH_2O$, wherein the complex is in an alkaline medium, and wherein $A^-$ is an anion other than arsenate, chromate, selenate, borate, perchlorate, and fluoride. Particularly contemplated complexes are formed on a solvent exposed area of the metal hydroxide.

In one aspect of the inventive subject matter, contemplated metals Me in the metal hydroxide complex include zirconium, hafnium, and/or titanium, and particularly preferred anions $A^-$ are cyanide and/or a cyanide gold complex (e.g., $[Au(CN)_2]^-$. Preferred media include aqueous media, and especially water (or water-based suspensions), and the pH of such media is generally contemplated to be at least 7.5, more typically at least 9.0, and most typically at about 11.0.

In another aspect of the inventive subject matter, a porous container includes the metal hydroxide complex according to the inventive subject matter, wherein the pores of the container allow diffusion of an anion from an alkaline medium into the container to form the metal hydroxide complex. While it is generally contemplated that such containers may have any size of shape, it is generally preferred that contemplated containers are cylindrical or have a high surface-to-weight ratio (e.g., tea bag shaped).

In a further aspect of the inventive subject matter, a method of reducing an anion concentration in an alkaline medium includes one step in which an alkaline medium is provided that includes an anion other than arsenate, chromate, selenate, borate, perchlorate, and fluoride. In another step, the anion is contacted in the alkaline medium with a metal hydroxide, thereby forming a metal hydroxide complex of the formula $Me(OH)_4*A^-*nH_2O$ or $MeO_2*A^-*nH_2O$, and in still another step, the metal hydroxide complex form the alkaline medium.

Various objects, features, aspects, and advantages of the present invention will become more apparent from the following detailed description of preferred embodiments of the invention.

DETAILED DESCRIPTION

The inventors have discovered that various metal hydroxides may be employed in alkaline medium to form a metal hydroxide complex of the formula $Me(OH)_4*A^-*nH_2O$ or $MeO_2*A^-*nH_2O$, wherein A– is an anion, n is an integer between 1 and 10000, and even higher, and Me is a metal (preferably titanium, more preferably hafnium, and most preferably zirconium) or a metal mixture.

As used herein, the term "metal hydroxide" generally refers to a compound of the formula $Me(OH)_4*nH_2O$ or $MeO_2*nH_2O$, wherein n is between 0.5 and 1000, and even higher, and wherein Me is a metal. It should be especially noted that contemplated metal hydroxides include water (*$nH_2O$) within their crystal structure, and such water may be water of crystallization and/or coordination. In contrast, the included water does not refer to water that is simply adsorbed on the metal hydroxide when the metal hydroxide is disposed in an aqueous medium. Furthermore, it should be appreciated that suitable metal hydroxides may be in an amorphous form as well as in a crystalline or other form. Still further, the term "zirconium hydroxide" is interchangeably used herein with the terms "hydrated zirconium oxide" and "zirconium hydrous oxide".

As also used herein, the term "metal hydroxide complex" refers to a compound in which a metal hydroxide binds at least one anion via a covalent or non-covalent bond (e.g., via ionic interaction, hydrogen bond, electrostatic interaction), wherein binding of the anion may be reversible or irreversible. Thus, particularly preferred metal hydroxide complexes will have a formula of $Me(OH)_4*A^-*nH_2O$ or $MeO_2*A^-*nH_2O$, wherein $A^-$ is an anion. In preferred aspects, the association constant $K_A$ for binding the anion to the metal hydride is at least 10 times (and even more preferably at least 100 times) the dissociation constant KD for dissociating the anion from the metal hydride under binding conditions.

As still further used herein, the term "alkaline" refers to a pH of a medium, wherein the pH is greater than 7.5. Most typically, contemplated alkaline media will have a pH of between about 8.0 to about 12.0, and particularly preferred pH values for alkaline media will be in the range of about 9.0 to about 11.0.

The term "about" when used in conjunction with numeric values herein refers to a range of +/−10% (inclusive) of the numeric value. For example, the term about 10% refers to a range of 9% to 11% (inclusive).

In one preferred aspect of the inventive subject matter, a metal hydroxide complex has a general structure according Formulae (I) or (II) below:

$Me(OH)_4*A^-*nH_2O$;                     Formula (I)

$MeO_2*A^-*nH_2O$;                         Formula (II)

wherein Me is zirconium, $A^-$ is cyanide ($CN^-$) or a anionic cyanide gold complex (e.g., $[Au(CN)_2]^-$), n is an integer between 1 and 10000, and even higher, and wherein the complex is in a water alkalinified with sodium hydroxide.

With respect to the metal, it should be recognized that all metals are contemplated suitable for use herein. However, particularly suitable metals include those of group four (e.g., zirconium, hafnium, or thorium), group five (e.g., niobium or tantalum), and six (e.g., molybdenum or tungsten) of the periodic table of elements. Alternatively, suitable metals also include tin, and various other metals that may form hydrous oxides or hydroxides. Still further, it should be recognized that where more than one metal hydroxide complex is present, a mixture of two or more metals (with one metal per metal hydroxide complex) are also appropriate.

Consequently, particularly contemplated metal hydroxide in contemplated metal hydroxide complexes include zirconium hydroxide (i.e., hydrous zirconium oxide), hafnium hydroxide, and titanium hydroxide, all of which are commercially available. For example, an especially preferred zirconium hydroxide is commercially available from Magnesium Elektron, Inc., which has numerous desirable characteristics. Among other properties, such zirconium hydroxide may be compacted relatively easily. Moreover, such commercially available zirconium hydroxide disperses easily in water and, once in a slurry, will readily settle if no agitation is provided.

The moisture content of such zirconium hydroxide is typically characterized by a loss on ignition ("LOI") of at least 40% upon heating at 1000° C. for 1 hour, and a density (when tamped to constant volume) of at least about 0.7 g/ml across the LOI range of 47% to 55%. Thus, and at least depending on the molecular weight and/or manner of producing such metal hydroxides, n (in the metal hydroxides and/or the metal hydroxide complexes) may range between 1 and 10000, and even higher.

With respect to the anion, it should be recognized that the anion $A^-$ need not be limited to cyanide or a anionic cyanide gold complex, and it is generally contemplated that all known anions may be used for formation of contemplated metal hydroxide complexes. For example, suitable anions may be monovalent (i.e., have a negative charge of −1) or polyvalent (i.e., have a negative charge of at least −2). Contemplated anions may also have various chemical compositions, and organic, inorganic, and organometallic anions are contemplated. For example, where the complex is formed from a biological material, suitable monovalent organic anions may include deprotonated carboxylic acids or amino acids, and suitable polyvalent organic anions may include nucleosides, phosphates, and so forth. Similarly, where the complex is formed from a synthetic chemical, suitable monovalent or polyvalent organometallic anions may include various carbosilanes. Likewise, where the complex is formed from a mineral or mineral-containing source, suitable monovalent inorganic anions may include chloride or bromide, and suitable polyvalent inorganic anions may include phosphates, sulfates, and so forth.

However, it is particularly preferred that the anion is formed from a material that has at least one of decreased stability, increased toxicity, and increased volatility in neutral and/or acidic medium. Thus, especially preferred anions include cyanide or a anionic cyanide gold complex, which generate hydrogen cyanide. It should further be recognized that when the pH of the medium is at or above pH 7.5, arsenate, chromate, selenate, borate, perchlorate, and fluoride are expressly excluded from the group of suitable anions (Binding of these anions at a neutral to slightly acidic pH has been described in U.S. Pat. No. 6,383,395 to Clarke et al., which is incorporated by reference herein).

It is still further contemplated that the alkaline medium may be comprise one or more solvents (e.g., protic, aprotic, polar, non-polar). However, especially preferred media include water to at least 50 vol %, more preferably at least 75 vol %, and most preferably at least 90 vol %. Regardless of the composition of the medium, it is contemplated that the medium is an alkaline medium, that is, a medium with a pH of greater than pH 7.5. Thus, the pH of contemplated media will typically be in the range of about 8.0 to about 12.0, even more typically in the range of about 9.0 to about 11.0 (or at about ph 11.0).

Contemplated metal hydroxide complexes may be formed in numerous manners, and it is generally contemplated that formation of such complexes takes place on a metal hydroxide particle, wherein the size and shape of suitable particles may vary considerably. For example, in a particularly preferred aspect of the inventive subject matter, contemplated metal hydroxides may be employed as powders, suspensions, or slurries, all of which may be enclosed in a porous container (see below), or applied as a layer to the surface of a porous article. For example, a layer of zirconium hydroxide may be pasted onto porous plastic films, glass frits, porous paper, cloth, and the like to provide a support, wherein such a support preferably retains the metal hydroxide when the metal oxide is in contact with an alkaline medium containing contemplated anions.

Upon provision of contemplated metal hydroxides, the metal hydroxide is then contacted with suitable anions in an alkaline medium, thereby forming contemplated metal hydroxide complexes. While not wishing to be bound by a particular theory, it is contemplated that the anion is bound to the metal hydroxide via a non-covalent bond in which the anion replaces a water molecule, and where the replaced water molecules is crystal water or coordinated water. Such binding is consistent with the inventor's observations (data not shown) that the binding capacity is in excess of the capacity that would be explained vi an anion exchange mechanism on the metal hydroxide.

Consequently, the inventors contemplate that metal hydroxides according to the inventive subject matter may be employed in a method to reduce the concentration of an anion in an alkaline medium. In such methods, an alkaline medium is provided (which may be alkaline, or acidic/neutral and then alkalinified) that includes an anion other than arsenate, chromate, selenate, borate, perchlorate, and fluoride. In a further step, the anion is contacted in the alkaline medium with a metal hydroxide, thereby forming a metal hydroxide complex of the formula $Me(OH)_4*A^{-*}nH_2O$ or $MeO_2*A^{-*}nH_2O$, and in yet another step, the metal hydroxide complex is removed from the alkaline medium.

With respect to the medium, the pH, the anion, and the metal, the same considerations as described above apply. Furthermore, it should be recognized that in preferred methods, the metal hydroxide complex is formed on a metal hydroxide particle (see above). While not limiting to the inventive subject matter, it is generally preferred that contemplated methods may additionally comprise a step in which at least some of the metal hydroxide is retained in a container, and that the container is at least partially immersed in the alkaline medium. In such cases, it should be appreciated that the container has a porous portion through which the medium containing the anion may enter and exit.

Therefore, the inventors contemplate a porous container comprising contemplated metal hydroxide complexes, wherein the pores of the container allow diffusion of an anion from an alkaline medium into the container to form the metal hydroxide complex. Such porous containers may be particularly advantageous where a medium (e.g., aqueous liquid) contains an anion (and particularly cyanide and/or a cyanide gold complex) that needs to be removed. In such cases, the container will include contemplated metal hydroxides and will be at least partially immersed in the medium.

It is generally contemplated that suitable containers may have any shape or size as long as they retain as least a portion of the metal hydroxide or metal hydroxide complex. However, it is preferred that the porous container will have a generally cylindrical shape, or a bag shape that provides a high surface to weight ratio. In particularly preferred aspects, the volume of the container is greater (e.g., at least 1.5 times, more typically at least 2 times, and most typically at least 5-10 time) than the volume of the metal hydroxide to allow formation of a metal hydroxide slurry within the container. Thus, where the porous container is immersed in the medium containing an anion, it should be recognized that the medium may be depleted from the anion using such containers. Therefore, it is contemplated that the metal hydroxide complex is formed on a metal hydroxide particle disposed within the container, and that the average pore diameter of the porous container is smaller than an average diameter of the metal hydroxide particle to retain the metal hydroxide (complex). Consequently, the pore size of the pores in the porous container and will predominantly depend on the average particle size. However, it is typically preferred that the average pore diameter is about 10 microns, with the average particle size being at least 10 microns, and more typically at least 20 microns.

Experiments

Adsorption of Cyanide-Gold Complexes Using Hydrated Zirconium Hydroxide 500 milliliter of an aqueous solution of a gold cyanide complex ($Na[Au(CN)_2]$) was prepared and dripped through 20 grams of zirconium hydroxide placed in a 2.5 cm glass column. Column loading was performed at pH 11. The solution contained sufficient quantities of free cyanide to develop a distinct smell of cyanide (about 1%). After passing the solution through the column, no cyanide smell could be detected. The column was then treated with 1% NaOH to remove the cyanide and gold cyanide, and the pass fraction and elution fraction were tested against known standards using AAS (atomic absorption spectroscopy) with the appropriate gold lamp.

Surprisingly, the pass fraction was almost entirely depleted from the gold cyanide complex (less than 1 ppb), while the eluent contained under the above described elution condition about 80% of the gold cyanide complex. It is expected that the recovery rate will be approaching 100% once all non-reversible binding sites in the zirconium hydroxide are occupied with gold cyanide complexes.

The zirconium hydroxide was regenerated using a hydrochloric acid rinse at about pH 3 (under increasingly intensifying cyanide smell) and a water rinse at about pH 6.0. All column loadings were performed at about pH 11. Alternatively, loading may be performed in a general alkaline medium, with a preferred pH range between about pH 8-11.

Of course, it should be recognized that the particular form of container will not be critical to the inventive subject matter. However, especially preferred containers include tea bag-type containers providing sufficient internal space for metal hydroxide slurry formation, or sausage-type porous tubing of relatively small diameter compared to their length (e.g., diameter-to-length ratio between about 1:5 to 1:20, and even higher).

Thus, specific embodiments and applications of anion adsorbent metal hydroxides have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of reducing a concentration of an anion in an alkaline medium, comprising:

providing an alkaline medium that includes an anion selected from the group consisting of cyanide and a cyanide metal complex;

contacting the anion in the alkaline medium with a metal hydroxide, thereby forming a metal hydroxide complex of the formula $Me(OH)_4*A^{-*}nH_2O$ or $MeO_2*A^{-*}$ nH$_2$O, wherein Me is selected from the group consisting of zirconium, hafnium, and titanium;

wherein Me is the metal, A$^-$ is the anion, and n is between 1 and 10,000; and removing the metal hydroxide complex from the alkaline medium.

2. The method of claim 1 wherein the alkaline medium comprises water.

3. The medium of claim 1 wherein the anion is cyanide.

4. The medium of claim 1 wherein Me is zirconium.

5. The method of claim 1 wherein the alkaline medium has a pH of at least 10.0.

6. The method of claim 1 wherein the metal hydroxide complex is formed on a metal hydroxide particle.

7. The method of claim 1 wherein the step of contacting further comprises retaining at least some of the metal hydroxide in a container, and at least partially immersing the container in the alkaline medium.

8. The method of claim 7 wherein the container has a porous portion.

9. The method of claim 7 wherein the container has a cylindrical shape.

* * * * *